J. L. ATKINS & J. C. AUCKLAND.
AUTOMATIC CONTROLLING DEVICE FOR OIL BURNERS.
APPLICATION FILED SEPT. 15, 1915.
1,177,085.
Patented Mar. 28, 1916.
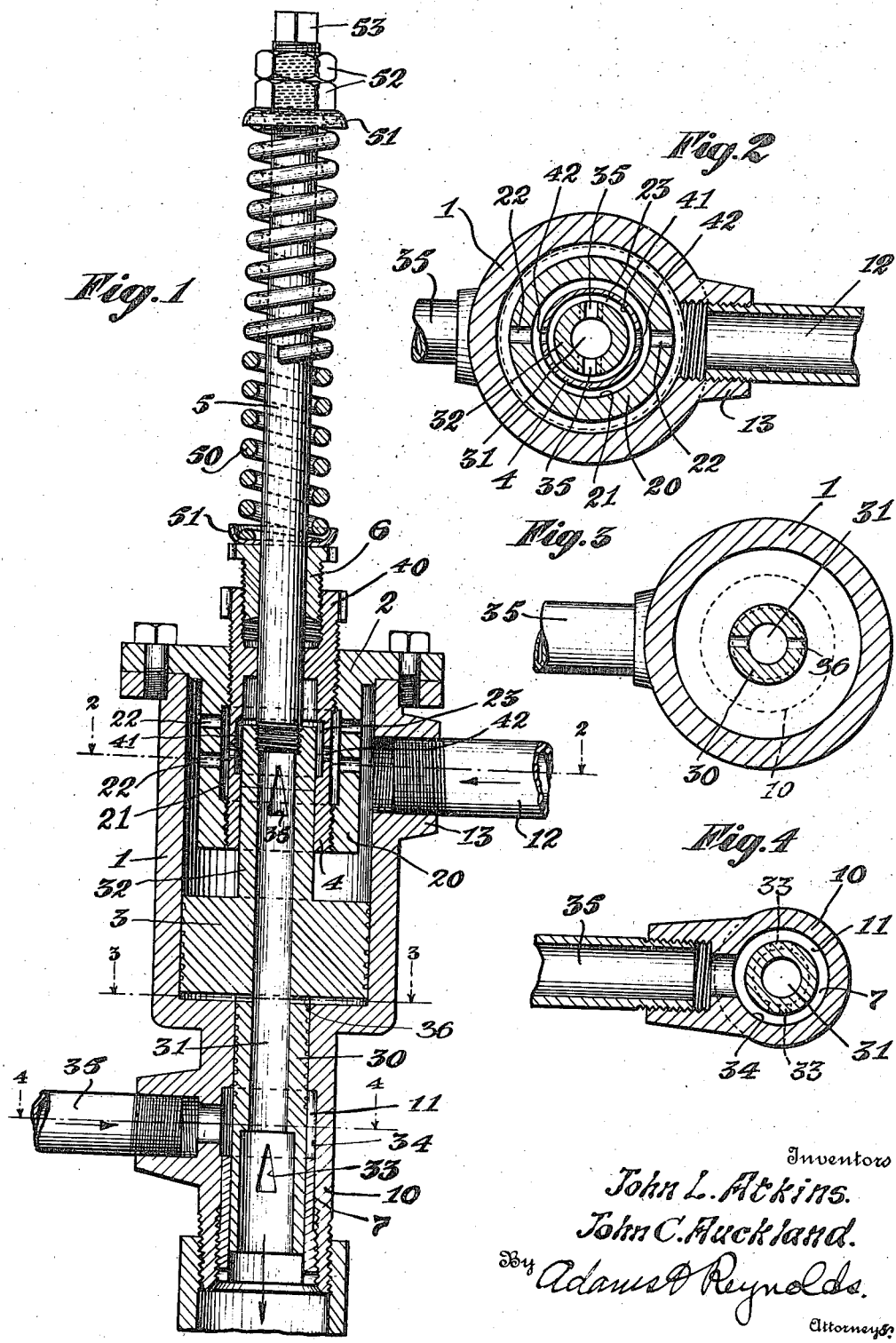
Inventors
John L. Atkins.
John C. Auckland.
By Adams & Reynolds.
Attorneys.

UNITED STATES PATENT OFFICE.

JOHN L. ATKINS AND JOHN C. AUCKLAND, OF SEATTLE, WASHINGTON.

AUTOMATIC CONTROLLING DEVICE FOR OIL-BURNERS.

1,177,085. Specification of Letters Patent. Patented Mar. 28, 1916.

Application filed September 15, 1915. Serial No. 50,914.

*To all whom it may concern:*

Be it known that we, JOHN L. ATKINS and JOHN C. AUCKLAND, citizens of the United States of America, and residents of the city of Seattle, in the county of King and State of Washington, have invented certain new and useful Improvements in Automatic Controlling Devices for Oil-Burners, of which the following is a specification.

Our invention consists of a device to be used in connection with oil burners to automatically control the steam and the oil used therein from the pressure in the boiler heated by the burner.

Our invention may therefore be called an automatic controlling device for oil burners.

The object of our invention is to provide a reliable and simple device whereby the supply of oil and steam may be automatically controlled to produce just the intensity of fire needed to maintain a constant boiler pressure.

Our invention comprises the various parts and combinations of parts which will be defined by the claims of this specification.

In the accompanying drawing we have shown our device in the form of construction which is now preferred by us.

Figure 1 is a longitudinal section through the assembled device. Figs. 2, 3 and 4 are transverse sections taken on lines 2—2, 3—3 and 4—4 respectively of Fig. 1.

In our invention we employ a piston which is subjected to the boiler pressure to push it against a spring, this piston actuating the oil and the steam controlling valves, thereby shutting off the supply of fuel when the pressure exceeds a given amount.

The piston 3 has extensions 30 and 32, which extend in the direction of movement of the piston. These may be considered as reduced axial extensions or large stems. These extensions or stems, are axially bored to form a passage 31 which extends through the piston. The bore 31 is connected with the space beneath the piston 3 by transverse bores 36, located even with the bottom edge of the piston. This permits a free movement of steam into the space beneath the piston, and out therefrom in accordance with the movement of the piston. The cylinder or casing 1 has an extension 10 which closely incloses the piston extension 30, forming a cylinder therefor. This has an inner peripheral recess 34 forming a port or oil flow channel 11 extending about the piston extension 30, in position to have its lower edge act as cut off for the port 33 in the extension 30. The oil supply pipe 35 connects with the recess 11. Piston 3 has a central extension or stem 32 at its opposite side, channel 31 extends through this also and it has a port 35 for the admission of steam. This end of the cylinder 1 is closed by a head 2 which has a sleeve 20 extending within the cylinder. The steam supply pipe 12 is connected at 13. Sleeve 20 is smaller than the bore of the cylinder, thus providing an annular space between them. Screwing into sleeve 20 is another sleeve or bushing 4. These two sleeves have peripheral recesses 21 and 41 and holes 22 and 42, communicating with said recesses. Sleeve 4 has a head 40, transversely slotted for engagement by a spanner when adjusting.

A rod 5 screws into the upper end of the piston extension 32 and extends through a gland or stuffing box formed by the outer end of sleeve 4 and the follower 6. Lock nuts 52 on its outer end take the thrust of spring 50 which surrounds the rod 5. Cup washers 51 are shown between the ends of the spring and the lock nuts at one end and the follower 6 at the other end. The outer tip of rod 5 is squared at 53, to permit turning it.

This device is intended, while in use, to have the steam and oil pressure continuously applied. Steam will pass through ports 22 and 42 to the annular chamber 23 which immediately surrounds piston extension or hollow stem 32. When the piston is in its extreme lower position, the upper point of port 35 is very slightly open, thus admitting a very little steam to central channel 31.

The sleeve 4 is adjustable to permit easily securing this result, or to get whatever adjustment may be desired. We may also use a bushing 7, screwing into the lower end of the sleeve or cylinder extension 10, to thereby make the lower edge of the recess 11 adjustable relative to the port 33 in the piston extension. These should preferably be adjusted to conform to the adjustment of the like parts at the other end of the device.

The pressure of steam upon the piston tends to force it down, while the spring tends to force it up. Until the pressure reaches the point for which the device is adjusted, the spring keeps the piston up and the ports 33 and 35 open to admit oil and steam. Upon passing this pressure, the steam will force the piston down, thus reducing the port openings and the amount of oil being delivered to the point at which the fire will keep the pressure constant.

Having thus described our invention, what we claim as new, and desire to secure by Letters Patent of the United States of America, is:

1. A feed controlling device for oil burners comprising a piston having opposite axial extensions and a bore extending lengthwise through both, each having a port in its side wall, cylinders inclosing said extensions, and connected respectively with the oil supply and with the steam supply and having ports adapted to register with the ports in the extensions, a cylinder inclosing the piston, and having a steam supply connection with one side of the piston and a spring acting in opposition to the steam upon the piston.

2. A feed controlling device for oil burners comprising a piston having central tubular extensions at each side connecting with each other, each extension having a port through its side wall, a cylinder having two parts fitting respectively upon the piston and one of the extensions thereof, one end of the cylinder being adapted for connection with the steam supply and the other with the burner, a sleeve fitting the other extension and adjustably supported from the cylinder, said sleeve having an interior recess adapted to register with the port in the piston extension, and a port connecting said recess with its exterior, the sleeve or cylinder inclosing the other piston extension having a like inner recess adapted to register with the port in said piston extension and adapted for connection of the oil supply pipe thereto.

3. A feed control for oil burners comprising a cylinder and piston therein, a steam connection acting upon one side of the piston, axial extensions from each side of the piston having a bore extending lengthwise through both and each having a supply port extending through its side wall, the cylinder having a casing inclosing one of these extensions and having an interior peripheral recess adapted to coöperate with the port in one of the piston extensions and an oil supply connection with said recess, a head for the other end of the cylinder, a sleeve adjustably carried by the head and inclosing the other piston extension and having an inner recess coöperating with the port in said piston extension, and a port communicating with the steam space of the cylinder.

4. A feed controlling device for oil burners comprising a cylinder, a piston therein actuated in one direction by steam pressure in the cylinder, the piston having a hollow stem extending in each direction, said stems being each provided with a port extending through its side wall, a tubular casing for each end of said stem having a port adapted to coöperate with the port in said stems, steam and oil connections with said respective casings, a rod extending from one of said piston stems outside the casing, a spring surrounding said rod and bearing against the casing and having an adjustable nut for engagement with the end of the spring.

Signed at Seattle, Washington, this 8th day of September, 1915.

JOHN L. ATKINS.
JOHN C. AUCKLAND.